United States Patent [19]

Burkel et al.

[11] Patent Number: 4,475,402
[45] Date of Patent: Oct. 9, 1984

[54] PRESSURE SENSING APPARATUS

[75] Inventors: Rainer Burkel, Lechesnay; Jean Denamps, Asnières; Cornelius Peter, Paris, all of France

[73] Assignee: Robert Bosch GmbH, Stuttgart, Fed. Rep. of Germany

[21] Appl. No.: 393,782

[22] Filed: Jun. 30, 1982

[30] Foreign Application Priority Data

Jul. 16, 1981 [DE] Fed. Rep. of Germany ....... 3128032

[51] Int. Cl.$^3$ ............................................... G01L 9/12
[52] U.S. Cl. ......................................... 73/724; 73/118
[58] Field of Search ........................ 73/118, 718, 724; 361/283

[56] References Cited

U.S. PATENT DOCUMENTS 2,250,471  7/1941  Bruin ................................. 73/724 X
4,257,274  3/1981  Shimada et al. ..................... 73/718

FOREIGN PATENT DOCUMENTS 2848856  5/1979  Fed. Rep. of Germany ........ 73/724
2059071  4/1981  United Kingdom .................. 73/724

Primary Examiner—Jerry W. Myracle
Attorney, Agent, or Firm—Frishauf, Holtz, Goodman & Woodward

[57] ABSTRACT

An etched metal membrane has its rim laser-welded or electron-beam-welded to a ring made of the same kind of metal within which a central electrode is held by a metal-to-glass seal. The welding is done in vacuum to avoid the necessity of later evacuation. The pressure sensor capacitance thus formed is connected through an impedance converter to an oscillator circuit which provides an output frequency that varies with the sensed pressure. The inner surface of the central electrode is flush with the surface of the rim to which the membrane is welded to reduce variations in capacitance of the sensor, and any residual variations are compensated by a resistance balance in the evaluation circuit. The insensitivity of the system to temperature and its service life make it suitable for sensing the intake air pressure of an internal combustion engine.

6 Claims, 2 Drawing Figures

PRESSURE SENSING APPARATUS

This invention concerns pressure sensing apparatus which is capable of responding to changes in the intake air pressure of an internal combustion engine of the kind having a deformable metallic membrane made of an etched small metal plate disposed opposite a metallic surface insulated from the membrane and forming a capacitor therewith.

A sensor of this type is disclosed in Published German Patent Application (OS) No. 29 38 205 in which the metallic surface forming one electrode is in the form of a thin conductive layer on one side of a small plate of insulating material. The membrane is secured by soldering to a conductive path provided as a thin layer that is also applied to the insulating plate. In this device, there results a disadvantageously high dependence upon temperature of the size of the effective air gap and hence of the measuring capacitor. The soldering process for applying the membrane requires expensive process steps, for example preliminary nickel or gold metallization. Furthermore, the volume of the pressure sensor which is to be evacuated is so small that even by keeping the device well below the leakage rates that are measurable today, the service life of the sensor has insufficient duration.

THE INVENTION

It is an object of the present invention to provide a pressure sensor that has the advantage that temperature effects are to a large extent excluded. It is a further object that the sensor should have low vulnerability to overload and that its construction should be simple and cost-effective.

Briefly, the metallic membrane is hermetically joined to a metal ring preferably of exactly the same material, for example by welding, and an electrode is provided within the ring, facing the membrane and sealed to the ring by a fused glass seal. The desired advantages are obtained with such a structure and improvements are also available by design of the evaluation circuit in accordance with a further elaboration of the invention, which allow for compensation for the slight scatter in dimension of the depth of etching of the membrane and of the input and circuit capacitances that are inevitable in production.

THE DRAWING

The invention is further described by way of illustrative example with reference to the annexed drawing, in which.

DESCRIPTION OF THE ILLUSTRATED EMBODIMENT

Figure 1:
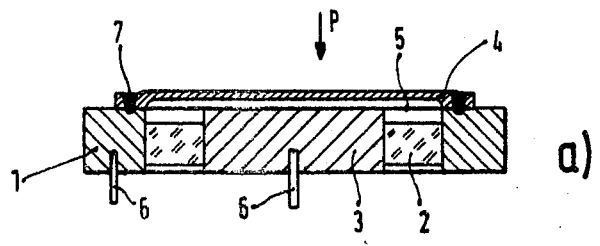
FIG. 1a is a cross section of a capacitive pressure sensor in accordance with the invention.
FIG. 1b is a detail view of the junction between the membrane and the outer ring.
Figure 1:
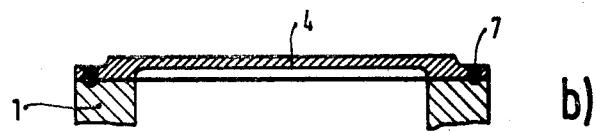

The capacitive sensor of FIG. 1 has a metallic external ring 1 within which a central electrode 3 is held by means of a glass-to-metal pressure seal 2. The rim of a membrane 4 etched out of a small metal plate so as to bring the rim forward for offsetting the membrane slightly from the front surface of the rim is bonded in pressure-tight fashion to the external ring 1, as shown by the weld bead 7. The membrane 4 encloses a cavity 5 which is evacuated. The membrane 4 together with the central electrode 3 forms an electrical capacitor of which the capacitance C is the greater, the more the pressure P acting on the membrane 4 from the outside rises and bends the membrane 4 towards the central electrode 3. A pressure-dependent electrical signal can be taken from the connection leads 6 that are respectively connected to the ring 1 and to the central electrode 3.

The surface of the outer ring 1 on which the membrane 4 lies and the face of the central electrode 3 are made coplanar by lapping or polishing. In this manner, the prescribed air gap provided by the etched profile of the membrane is exactly maintained. The membrane 4 is affixed to the ring 1 by laser or electron beam welding in a process in which the laser beam or electron beam remais fixed in position and the parts to be welded together are passed through the beam by a drive or else in a process in which the parts to be welded are fixed and the laser or electron beam is moved in a circle by a drive. The welding process is preferably carried out in vacuum so that subsequent evacuation of the cavity 5 becomes unnecessary. Furthermore, care must be taken that the membrane 4 is not arched or domed as a result of heat introduced by the welding operation. Such distortion is prevented by backing the membrane 4 by applying a backing plate thereto. The backing plate is preferably permanently magnetic since in that case a second synchronously running drive for the backing plate is thereby made unnecessary. For further diminution of the necessary welding energy the membrane 4 can be further etched in a supplementary fashion in the region where it is to be welded to the outer ring 1, reducing the membrane cross section there (see FIG. 1b).

The membrane 4 and the outer ring 1 consist of materials that are to a great extent of the same kind or even identical, in order to exclude temperature effects.

The fused glass pressure seal 2 as shown in section in FIG. 1 has a smaller thickness (vertical dimension in FIG. 1) than the central electrode 3 or the outer ring 1, as a result of which the spacing between the membrane 4 and the fused glass seal 2 is greater than the spacing between the membrane 4 and the central electrode 3. In consequence, the cavity 5 is enlarged without changing the properties which are prescribed by the air gap.

Figure 2:
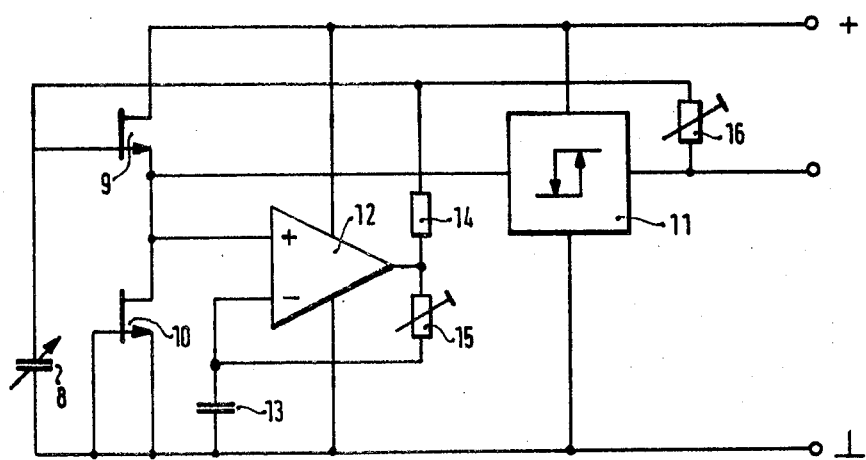
FIG. 2 is a diagram of an evaluation circuit in accordance with the invention.

FIG. 2 shows an evaluation circuit for further processing of the signals provided by the pressure sensor of FIG. 1. The evaluation circuit can, as shown in the aforesaid German Patent Document DE-OS No. 29 38 205, be provided on the rear side of the pressure sensor or on a separate circuit board connected by means of the leads 6. In FIG. 2, the presssure sensor is designated 8. One connection is made to ground and the other connection goes on the one hand to an impedance converter consisting of two n-channels blocking layer field effect transistors 9 and 10, and on the other hand, through a first potentiometer 16, to the output of an RC oscillator 11 that can be constituted as a multivibrator utilizing an operational amplifier not separately shown in the drawing. The output of the impedance converter 9, 10 is connected to the non-inverting input of an operational amplifier 12. The inverting input of the operational amplifier 12 is connected through a capacitor 13 to ground. The output of the operational amplifier 12 is connected on the one hand through a resistor 14 to the input of the impedance converter 9, 10 and thereby with the pressure sensor 8 and, on the other hand, through a second potentiometer 15 to its own inverting input.

The interposition of the impedance converter 9, 10 reduces the input resistance and the input capacitance of the next stage which is the RC oscillator 11. In consequence, readily available integrated comparators can be utilized to constitute this oscillator. The effective input capacitance of the circuit lies between 1 and 2.5 pF. The network consisting of the operational amplifier 12, resistor 14, potentiometer 15 and capacitor 13 serves to compensate the unavoidable circuit and input capacitances. This network behaves as a negative capacitance, the value of which is determined by the product of the capacitance of the capacitor 13 and the quotient of the resistance values 14 and 15. The value of the capacitance can therefore be set by the second potentiometer 15 so that pressure sensors that vary from one to another in their ratio of capacitance at lower limit of pressure to be measured to the capacitance at the corresponding upper limit can be compensated to the same ratio, which is to say to the same range of value change. It is thereby possible to compensate for scatter in the value of etching depth of the membrane 4 occuring in manufacture and scatter in the input and circuit capacitance by means of a resistance balance.

The apparatus of the invention is particularly well suited for sensing the intake air pressure of an internal combustion engine and lends itself well to being built into the intake manifold of such an engine because of its small dimensions and its insensitivity to temperature. The equipment can supply an electrical magnitude that is variable in a manner dependent upon the momentary intake air pressure, preferably a frequency present at the output of the RC oscillator 11, which varies with pressure. The frequency has a linear course over the pressure range in question and through the benefit of compensation with the second potentiometer 15, different pressure sensors can be given the same frequency ranges, i.e., the same values for the ratio of the frequency at the lower limit to the frequency at the upper limit of the pressure range.

By a further compensation with the first potentiometer 16, it is possible to shift the probably different frequency courses of different pressure sensors having the same range, so that all frequency courses in question cover each other. Thus, for all pressure sensors, equal frequency output values will be obtained for the same pressure within the operating range.

Although the invention has been described with reference to a particular illustrative example, it will be understood that variations and modifications are possible within the inventive concept.

For a satisfactory pressure-tight fused glass seal 2, when the metal of the ring 1 is of a 40-42% NiFe-metal with a temperature-constant module of elasticity and the electrode 3 of a 36% NiFe-Metal, the following glass seal composition for melting and bonding in the gap between the ring and the electrode is satisfactory: No. 8419 made by Schott.

We claim:

1. Apparatus for sensing pressure, capable of responding to changes of intake air pressure of an internal combustion engine and comprising:

a metallic membrane (4) formed of an etched metal platelet to provide an attachment rim for said membrane slightly and uniformly in front of the peripheral portion of said membrane;

a metal ring (1), to a flat surface of which said rim of said membrane is joined by metal-to-metal fusion in an airtight, pressure-resistant and electrically conductive manner;

an electrode (3) located centrally in said metal ring bonded to said metal ring by a single pressure-tight fused glass seal, insulated from said metal ring and said membrane, and having a surface coplanar with said flat surface of said metal ring, and connections to said metal ring and to said electrode for using said membrane and said electrode as a pressure-sensitive capacitor in an electrical evaluation circuit.

2. Apparatus as defined in claim 1 in which said membrane (4) and said metal ring (1) are made of the same metallic material.

3. Apparatus for sensing pressure, capable of responding to changes of intake air pressure of an internal combustion engine and comprising:

a metallic membrane (4) formed of an etched metal platelet to provide an attachment rim for said membrane slightly and uniformly in front of the peripheral portion of said membrane;

a metal ring (1) to a flat surface to which said rim of said membrane is joined in an airtight, pressure-resistant and electrically conductive manner;

an electrode (3) located centrally in said metal ring bonded to said metal ring by a pressure-tight fused glass seal, insulated from said metal ring and said membrane, and having a surface coplanar with said flat surface of said metal ring, the spacing between said membrane and said glass seal being greater than the spacing between said membrane and said electrode, whereby the volume of the cavity between said membrane and said electrode is increased, and connections to said metal ring and to said electrode for using said membrane and said electrode as a pressure-sensitive capacitor in an electrical evaluation circuit.

4. Apparatus for sensing pressure, capable of responding to changes of intake air pressure of an internal combustion engine and comprising:

a metallic membrane (4) formed of an etched metal platelet to provide an attachment rim for said membrane slightly and uniformly in front of the peripheral portion of said membrane;

a metal ring (1) to a flat surface of which said rim of said membrane is joined in an airtight, pressure-resistant and electrically conductive manner;

an electrode (3) located centrally in said metal ring bonded to said metal ring by a pressure-tight fused glass seal, insulated from said metal ring and said membrane, and having a surface coplanar with said flat surface of said metal ring;

an evaluation circuit including an RC oscillator circuit and an impedance converter for reducing the input resistance and input capacitance of said RC oscillator circuit, said impedance converter having two field effect transistors (9,10) as active elements thereof, and connections to said metal ring and to said electrode for using said membrane and said electrode as a pressure-sensitive capacitor in said electrical evaluation circuit.

5. Apparatus as defined in claim 4 in which said evaluation circuit includes a network for compensation of circuit and input capacitances, said network comprising:
  an operational amplifier (12) having an inverting and a non-inverting input;
  a capacitor (13) connected with one of said inputs of said operational amplifier, and
  two feedback resistances (14, 15) both connected to the output of said operational amplifier and respectively connected to said two inputs of said operational amplifier.

6. Apparatus as defined in claim 5 in which one of said resistances is variable, whereby variation produced in manufacture in the value of the range of the capacitance between said membrane (4) and said centrally located electrode (3) may be compensated for.

* * * * *